(12) United States Patent
Suzuki

(10) Patent No.: US 8,394,304 B2
(45) Date of Patent: Mar. 12, 2013

(54) METHOD FOR MOLDING SYNTHETIC RESIN MOLDINGS

(75) Inventor: Keisuke Suzuki, Osaka (JP)

(73) Assignee: Naigai Kasei Co., Ltd., Osaka-shi (JP)

( * ) Notice: Subject to any disclaimer, the term of this patent is extended or adjusted under 35 U.S.C. 154(b) by 528 days.

(21) Appl. No.: 11/440,635

(22) Filed: May 25, 2006

(65) Prior Publication Data

US 2006/0267242 A1    Nov. 30, 2006

(30) Foreign Application Priority Data

May 27, 2005  (JP) .................................. 2005-154944

(51) Int. Cl.
*B29C 47/00*   (2006.01)

(52) U.S. Cl. ........ 264/148; 264/138; 264/294; 264/239; 264/328.4; 264/328.1; 264/327

(58) Field of Classification Search .................. 264/327, 264/328.1, 239, 294, 328.4, 148, 138
See application file for complete search history.

(56) References Cited

U.S. PATENT DOCUMENTS

| | | | | |
|---|---|---|---|---|
| 3,670,066 A | * | 6/1972 | Valyi ............................. | 264/148 |
| 3,755,526 A | * | 8/1973 | Watanabe ................... | 264/178 F |
| 4,219,322 A | * | 8/1980 | Chang et al. .................. | 425/547 |
| 4,576,775 A | * | 3/1986 | Kaeufer et al. ............... | 264/323 |
| 5,044,925 A | * | 9/1991 | Watanabe ...................... | 425/542 |
| 5,855,935 A | * | 1/1999 | Brent et al. .................... | 425/574 |
| 2004/0022885 A1 | * | 2/2004 | Suzuki .......................... | 425/130 |

FOREIGN PATENT DOCUMENTS

| | | | |
|---|---|---|---|
| JP | 11263357 A | * | 9/1999 |
| JP | 11314256 A | | 11/1999 |
| JP | 2003-275278 A | | 9/2003 |
| JP | 2005-7728 A | | 1/2005 |
| TW | 350593 A | | 1/1999 |
| TW | 445202 A | | 7/2001 |

* cited by examiner

*Primary Examiner* — Yogendra Gupta
*Assistant Examiner* — John Robitaille
(74) *Attorney, Agent, or Firm* — The Webb Law Firm

(57) ABSTRACT

The synthetic resin moldings are molded pressing the bottom force 210 to the top force for feeding 103, followed by feeding the melted synthetic resin raw material to the opening portion 2101 of the bottom force 210 through said feeding path 1023 of the top force for feeding 103, thereby filling said synthetic resin in the cavity in the mold CT1 made up by closing the mold with this top force for feeding 103 and the bottom force 210, followed by pushing down the bottom force 210, and extending said synthetic resin raw material contained in said feeding path 1023 and tearing off at the portion X where the raw material has prescribed amount of resin blocks RX for molding, pushing up this bottom force 210 in which these torn resin blocks RX are placed and remained to the top force for molding 104, thereby closing the mold and compressing.

11 Claims, 18 Drawing Sheets

METHOD FOR MOLDING SYNTHETIC RESIN MOLDINGS

This application claims priority based on Japanese Patent Application No. 2005-154944, the contents of which are incorporated in their entirety by reference herein.

BACKGROUND OF THE INVENTION

1. Field of the Invention

The present invention relates to a method for molding various kinds of synthetic resin moldings. In particular, the present invention relates to a method for molding thermoplastic elastomer resin moldings preferably used as medical containers such as infusion containers, blood collecting tubes, and the like, or as plug bodies to which a needle can be stuck in medical caps.

2. Description of the Prior Art

Conventionally, as a method for molding using synthetic resin raw materials, compression molding methods by which resin raw materials which were put in a mold are pressurized and molded has been proposed as disclosed in Japanese Patent Laid-Open Publication No. 2003-275278.

However, unlike generally used injection moldings, in the above mentioned compression moldings, a block of a resin raw material is pressurized and molded in a mold, and therefore, metering and injection are not conducted at the same time, while pressurizing is applied while filling in the mold as injection moldings. Therefore, in compression moldings, a resin cannot be replenished during the molding process and contents or shapes change in said mold. Therefore, when the amount of resin raw materials to be put in a mold is too much, burr is likely to occur, while on the other hand, when the amount of resin raw materials to be put in a mold is too little, prescribed moldings cannot be obtained and become defective. Therefore, to establish a method for putting raw materials in a mold made up of a bottom force and a top force, and to set conditions for putting raw materials in a mold are the important issues to be solved in a compression molding method. In particular, in the case of a plug body for infusion in which sticking operations are conducted using injection needles and the like, unlike thin moldings such as packings obtained by compression moldings such as mere press moldings, single resin moldings must be obtained which have thickness and uniform quality as a whole since it is necessary that said moldings are provided in an opening portion of an infusion container which is set upside down at the time of use and that liquid leakage of infusion in a container must be prevented in keeping the state of the infusion container being upside down.

In this regard, such kinds of conventional molding methods do not necessarily disclose satisfactory technology regarding methods for feeding raw materials in molds and feeding condition, and in particular, there has been no disclosure as to the methods for molding thick molds having uniform quality as a whole by compression molding methods.

Therefore, the object of the present invention is to solve the above mentioned problems and the object of the present invention lies in providing a method for molding synthetic resin moldings capable of continuously obtaining thick synthetic resin moldings having uniform quality as a whole.

SUMMARY OF THE INVENTION

The present invention has solved the above mentioned problems by employing the means for keeping input of melted resin raw materials in prescribed amount or in prescribed shapes.

The present invention relates to a method for molding synthetic resin moldings comprising a process of cutting on the way of feeding of the melted synthetic resin raw material and a process of molding the cut resin block.

The present invention also relates to a method for molding synthetic resin moldings obtained by extending a melted synthetic resin raw material on the way of feeding, tearing off the extended portion, and molding torn resin block.

The present invention relates to a method for molding synthetic resin moldings comprising a process of pulling the end portion to which the melted synthetic resin raw material is fed in the process where an outer surface or a surface becomes solidified, while its internal portion maintains a melted state, a process of extending said melted synthetic resin raw material on the way of feeding, a process of tearing off the extended portion, and a process of molding the torn resin block.

The present invention further relates to a method for molding synthetic resin moldings comprising a process of feeding the melted synthetic resin raw material inside of a bottom force through a feeding path, a process of tearing off said synthetic resin raw material at a portion where the synthetic resin raw material becomes a prescribed amount of a resin block for molding which is included in the feeding path in the feeding path to said bottom force, a process of compressing the resin block for molding which was torn off, placed and remained in said bottom force by a top force for molding, and a process of molding the synthetic resin moldings.

The present invention relates to the method for molding the synthetic resin moldings as set forth herein, wherein said feeding path is provided in a top force for feeding of said synthetic resin raw material, and comprising the process of feeding the melted synthetic resin raw material inside of the bottom force through the feeding path of this top force for feeding, a process of tearing off said synthetic resin raw material at a portion where the raw material becomes a prescribed amount of a resin block for molding which is included in the feeding path in the feeding path to said bottom force after filling said synthetic resin in a cavity in a mold made of this top force for feeding and the bottom force, a process of compressing the resin blocks for molding which were torn off, placed and remained in said bottom force by a top force for molding, and a process of molding the synthetic resin moldings.

The present invention relates to the method for molding the synthetic resin moldings as set forth herein, wherein said synthetic resin raw material is the raw material of an olefin-series resin.

The present invention relates to the method for molding the synthetic resin moldings as set forth herein, wherein said synthetic resin raw material is the raw material of a thermoplastic elastomer resin.

The present invention relates to the method for molding the synthetic resin moldings as set forth herein, wherein said tearing off is made by detaching and shifting said bottom force from said feeding path.

The present invention relates to the method for molding the synthetic resin moldings as set forth herein, wherein the melting point of said feeding path is set over the melting point of said synthetic resin raw material, and the melting point of the bottom force is set less than the melting point of said synthetic resin raw material.

The present invention relates to the method for molding the synthetic resin moldings as set forth herein, wherein the melting point of said feeding path is set over the melting point of said synthetic resin raw material by 10 to 20° XC and the melting point of the bottom force is set to be 10 to 80° C.

The present invention relates to the method for molding the synthetic resin moldings as set forth herein, wherein said top force for feeding is made up at the end portion of a nozzle for transmission of said synthetic resin raw material and provided with a top force main body portion which closes the bottom force, and the feeding path to the bottom force which continues from the transmitting path of the main portion of said nozzle for transmission is provided inside of said top force main body portion.

The present invention relates to the method for molding the synthetic resin moldings as set forth herein, wherein said top force for feeding is movably divided to the tip end portion of the nozzle for transmission of said synthetic resin raw material, said top force is made up of a sliding portion vertically and slidably installed to said tip end portion and the upper main body portion which closes the bottom force which continues to this sliding portion, and the feeding path to the bottom forced which leads to the transmitting path of the main portion of said transmitting nozzle inside of said sliding portion and said main body portion.

The present invention relates to the method for molding the synthetic resin moldings as set forth herein, wherein the feeding path to said bottom force has the first feeding path which leads to a transmitting path of the main portion of said nozzle for transmission and the second feeding path which continues to the first feeding path and whose cross-sectional area gradually increases towards an opening portion of the bottom force.

The present invention relates to the method for molding the synthetic resin moldings as set forth herein, wherein the top force for feeding is provided with the upper main body portion which makes up the tip end portion of the nozzle for transmission of the melted synthetic resin raw material and closes the bottom force, and the feeding path to the bottom force which continues from the transmitting path of the main portion of the nozzle for transmission inside of said top force main body portion, and comprising a process of closing the mold by pressing the bottom force to this top forced for feeding, a process of feeding the melted synthetic resin raw material to the opening portion of the bottom force through said feeding path of the top force for feeding, a process of filling said synthetic resin in a cavity in the mold which is made up by closing the mold by this top force for feeding and bottom force, a process of pushing down the bottom force, a process of extending said synthetic resin raw material contained in said feeding path, a process of tearing off the resin raw material at the portion where the raw material has a prescribed amount of resin blocks for molding, a process of pushing up this bottom force in which these torn resin blocks for molding are placed and remained to the top force for molding, a process of compressing, and a process of closing the mold.

The present invention relates to the method for molding the synthetic resin moldings as set forth herein, wherein said bottom force is provided with a sliding core which communicates to the opening portion of said bottom force and a pin which slides and moves in this sliding core, and comprising a process of extending said synthetic resin raw material contained in said feeding path, synchronizing with the pushing down of said bottom force, said pin is pulled down and while maintaining said raw material resin by negative pressure generated between raw material resin to be placed and remained and the bottom force, and a process of tearing off the resin raw material at the portion where the raw material has a prescribed amount of molding resin blocks.

The present invention relates to the method for molding the synthetic resin moldings as set forth herein, wherein the top force for feeding is provided with the feeding path to the bottom force which is attached to the nozzle for transmission of the melted synthetic resin raw material vertically and slidably and which leads to the transmitting path of the main portion of said transmitting nozzle, and comprising a process of closing the mold pressing the bottom force to this top force for feeding, slidably pushing up the top force for feeding to said transmitting nozzle, a process of feeding the melted synthetic resin raw material inside of the bottom force from said feeding path of the top force for feeding, a process of filling said synthetic resin in a cavity in the mold made up by closing the mold by this top force for feeding and bottom force, a process of pushing down the bottom force, a process of extending said synthetic resin raw material by slidingly lowering the top force for feeding from the nozzle for transmission accordingly, a process of tearing off the resin raw material at the portion where the raw material has a prescribed amount of molding resin blocks, a process of pushing up this bottom force in the top force for molding, a process of compressing, and a process of closing the mold.

The present invention relates to the method for molding the synthetic resin moldings as set forth in claim 1 herein, wherein said synthetic resin mold is a medical plug body.

The present invention relates to the medical plug body molded by the method set forth herein.

BRIEF DESCRIPTION OF THE DRAWINGS

FIG. 3-1 is a schematic cross-sectional view of a transmitting nozzle of resin raw materials and a bottom force showing the beginning process of the metering process in the present embodiment;

FIG. 3-2 is a schematic cross-sectional view of the transmitting nozzle of resin raw materials and a bottom force showing the beginning process of said mold closing process in the present embodiment;

FIG. 3-3 is a schematic cross-sectional view of the transmitting nozzle of resin raw materials and the bottom force showing the filling process of said resin;

FIG. 3-4 is a schematic cross-sectional view of the transmitting nozzle of resin raw materials and a bottom force showing the beginning process of said tearing;

FIG. 3-5 is a schematic cross-sectional view of a transmitting nozzle of resin raw materials and a bottom force showing the completion process of said metering process;

FIG. 4-1 is a schematic cross-sectional view of the top force for feeding and bottom force showing the beginning process of the compressing process (molding process) of the present embodiment;

FIG. 4-2 is a schematic cross-sectional view of the top force for molding and a bottom force showing said closing mold process;

FIG. 4-3 is a schematic cross-section view of the top force for molding and a bottom force showing said molding process;

FIG. 5-1 is a schematic cross-sectional view showing the state in which a resin is filled in the top force for feeding and bottom force in the metering process of the second embodiment related to the present invention;

FIG. 5-2 is a schematic cross-sectional view of the top force for feeding and bottom force showing the tearing process of said resin;

FIG. 5-3 is a schematic cross-sectional view of the top force for feeding and bottom force showing the state in which said resin is torn off;

FIG. 6-1 is a schematic cross-sectional view showing the state in which a resin is filled in the top force for feeding and bottom force in the metering process of the third embodiment related to the present invention;

FIG. 6-2 is a schematic cross-sectional view of the top force for feeding and bottom force showing the tearing process of said resin;

FIG. 6-3 is a schematic cross-sectional view of the top force for feeding and bottom force showing the state in which said resin is torn off;

FIG. 7-1 is a schematic cross-sectional view showing the state in which a resin is filled in the top force for feeding and bottom force in the metering process of the fourth embodiment related to the present invention;

FIG. 7-2 is a schematic cross-sectional view showing the state of said torn raw material resin falling to the bottom force; and FIG. 7-3 is a schematic cross-sectional view showing the state of said raw material resin put into the bottom force.

DESCRIPTION OF THE PREFERRED EMBODIMENTS

Hereinafter, as one embodiment of the present invention, the molding method of a medical plug body is explained. However, the present invention is not limited to the explanation below.

The molding method of the present invention at least comprises the steps of a heating process in which resin raw materials are heated, a raw material metering process in which said heated resin raw materials are metered and introduced into a cavity in a mold, and a compressing process (molding process) in which said introduced resin raw materials are molded (formed) applying pressure and compressing the resin raw materials to have plug body shapes. The specification of the present application hereby calls this series of process a compression molding method in the present invention.

Figure 1:
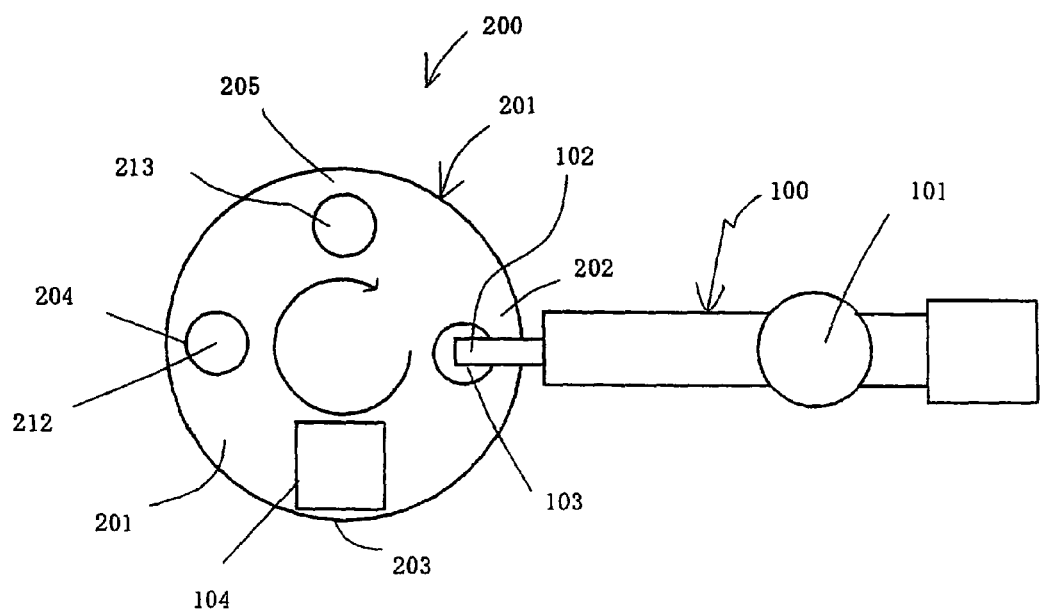
FIG. 1 is a schematic plan view showing one example of compression molding devices for carrying out the method of the present invention.
Figure 2:
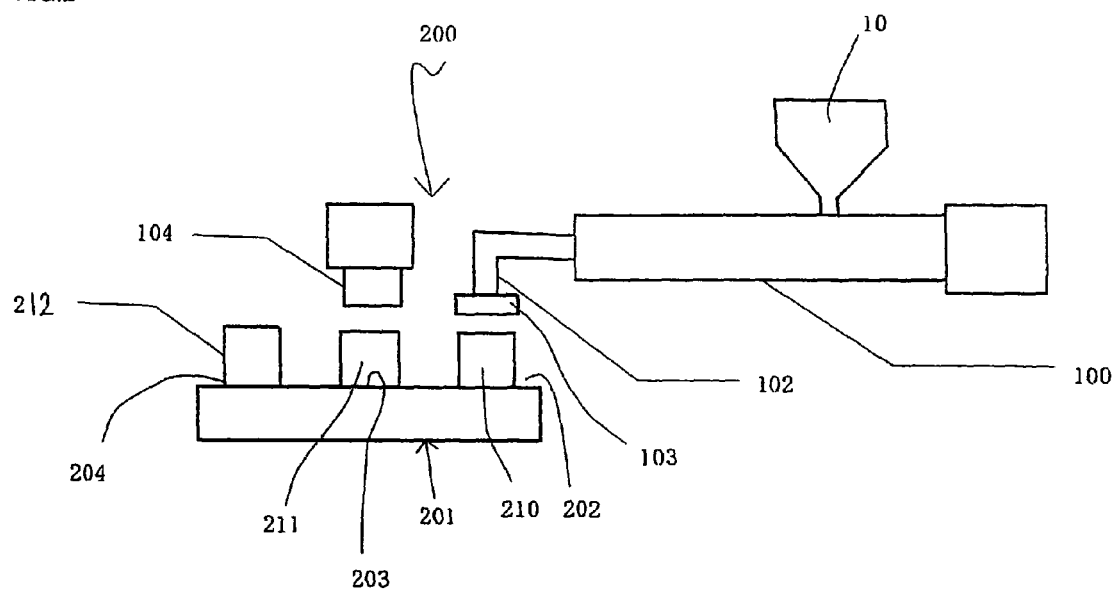
FIG. 2 is a schematic side view in FIG. 1.

FIG. 1 is a schematic plan view showing one example of compression molding devices for carrying out the method of the present invention. FIG. 2 is a schematic side view in FIG. 1. In FIGS. 1 and 2, 100 is an extruder and 200 is a molding machine. 101 is a hopper which puts raw materials in the extruder 100. 102 is a nozzle for transmission which transmits melted resin raw materials which were heated and extruded by the extruder 100 to the molding machine 200.

A molding machine 200 is, as shown in FIGS. 1 and 2, provided with a molding table 201 which intermittently rotates clockwise (in the direction of the arrow shown in FIG. 1). The molding table 201 is provided with a metering station 202 which meters melted resin raw materials fed from said nozzle for transmission 102, a compressing station which compresses and molds (forms) resin raw materials metered by this metering station 202, a cooling station which cools the moldings (molded products) molded in the compressing station, and an ejecting station 205 which ejects the moldings cooled in the cooling station 204. In addition, 210, 211, 212, and 213 are bottom forces installed on all sides of the molding table 201, and 103 is a top force for feeding resin raw materials provided at the tip end portion of the nozzle for transmission 102, and 104 is a top force for molding.

Therefore, according to this molding device, melted resin raw materials extruded from the extruder 100 are fed to the metering station 202 from the nozzle for transmission 102, and are metered by the top force for feeding 103 and the bottom force 210. The resin raw materials metered and put on the bottom force 210 rotates together with this bottom force 210 and after shifting to the position of the bottom force 211 of the compressing station 203, resin raw materials are compressed and molded (formed) by the rotated bottom force 210 and the top force for molding 104. After such molding, resin raw materials further rotate and shift to the position of the bottom force 212 of the cooling station 204 together with the bottom force 210, and then are cooled, and these cooled resin raw materials further rotate and shift to the ejection station 205 together with the bottom force 210 and are ejected.

(Example 1 of a Metering Process)

Figures 1, 3:
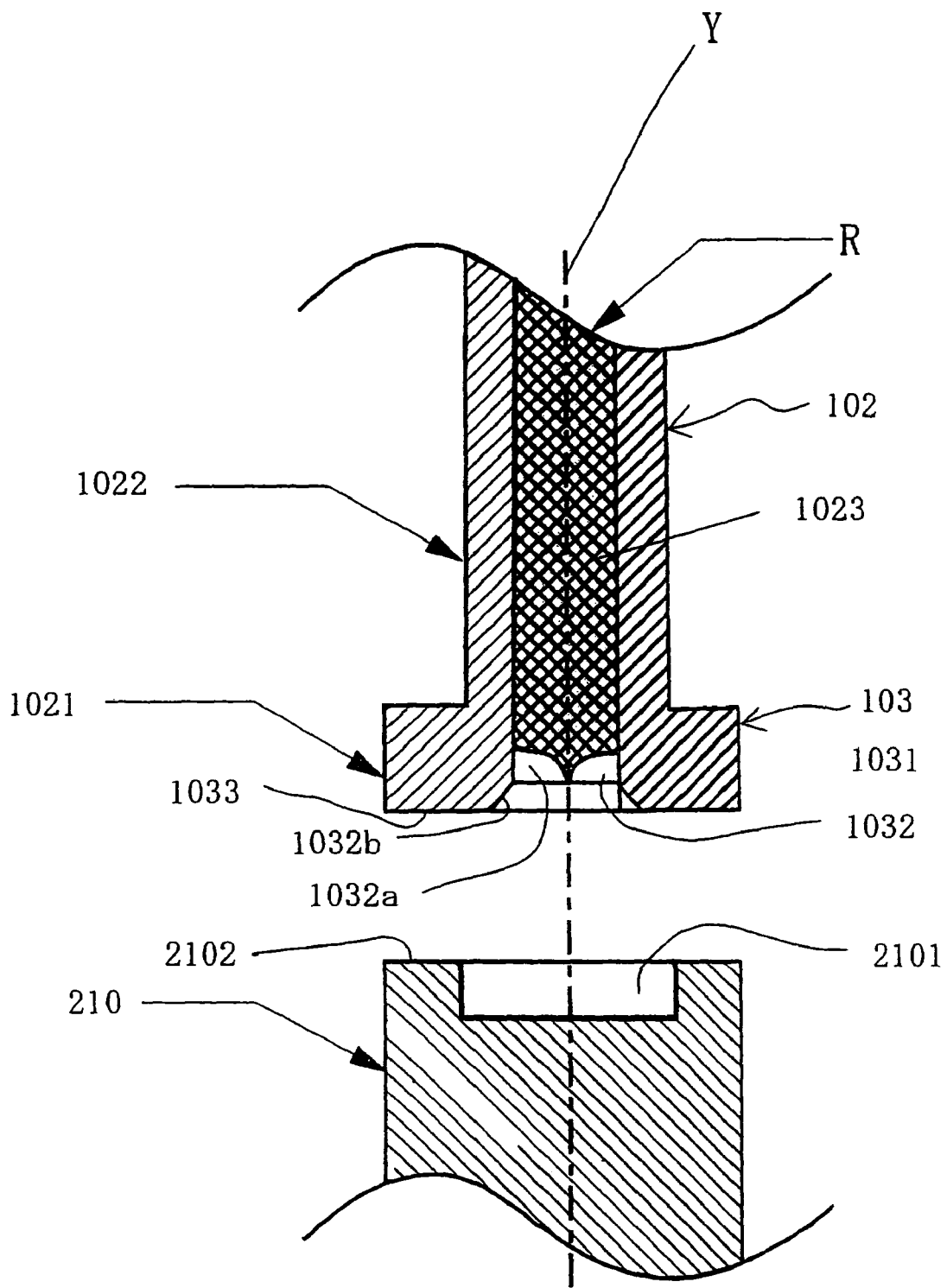
Figures 2, 3:
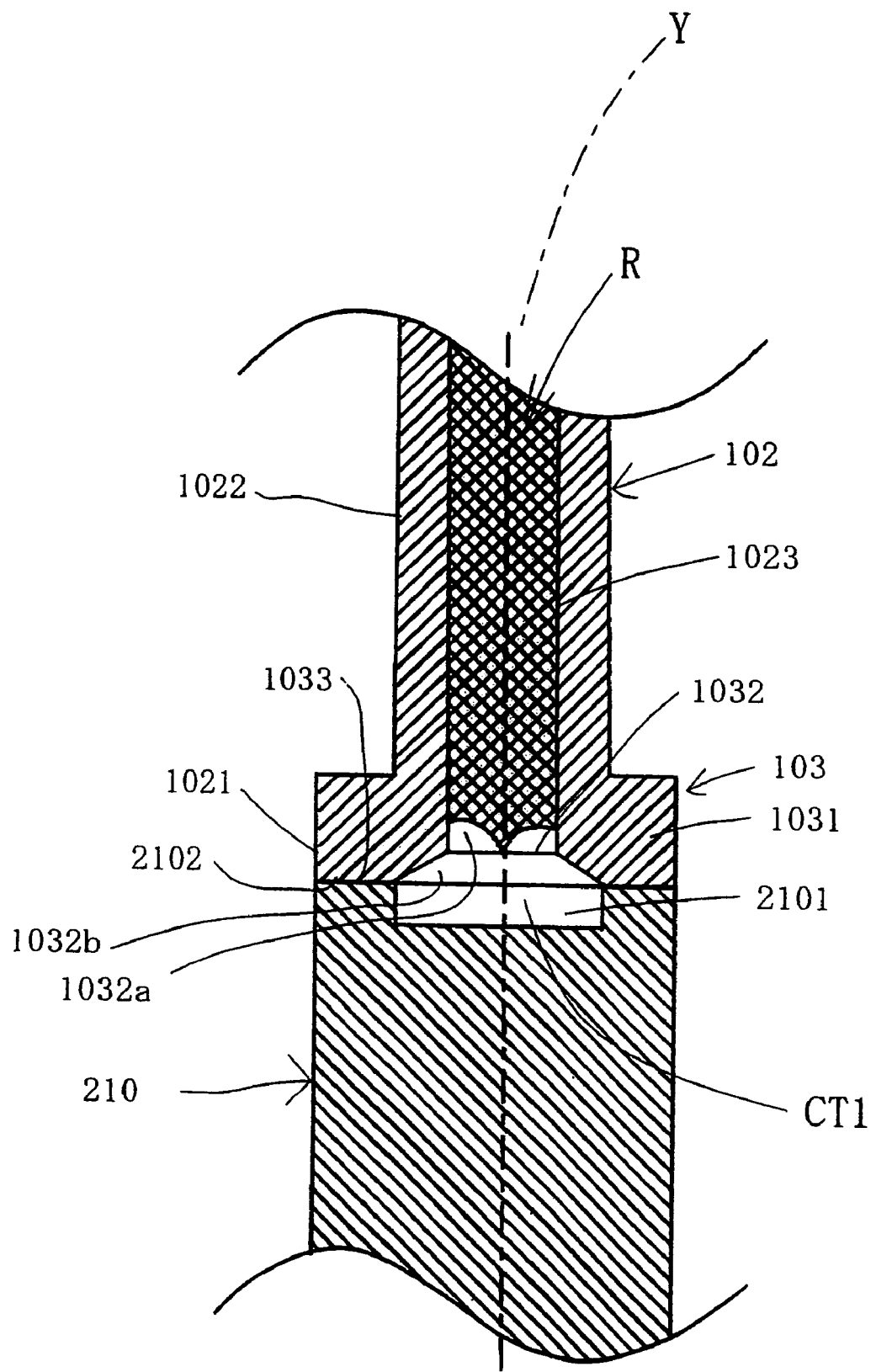
Figure 3:
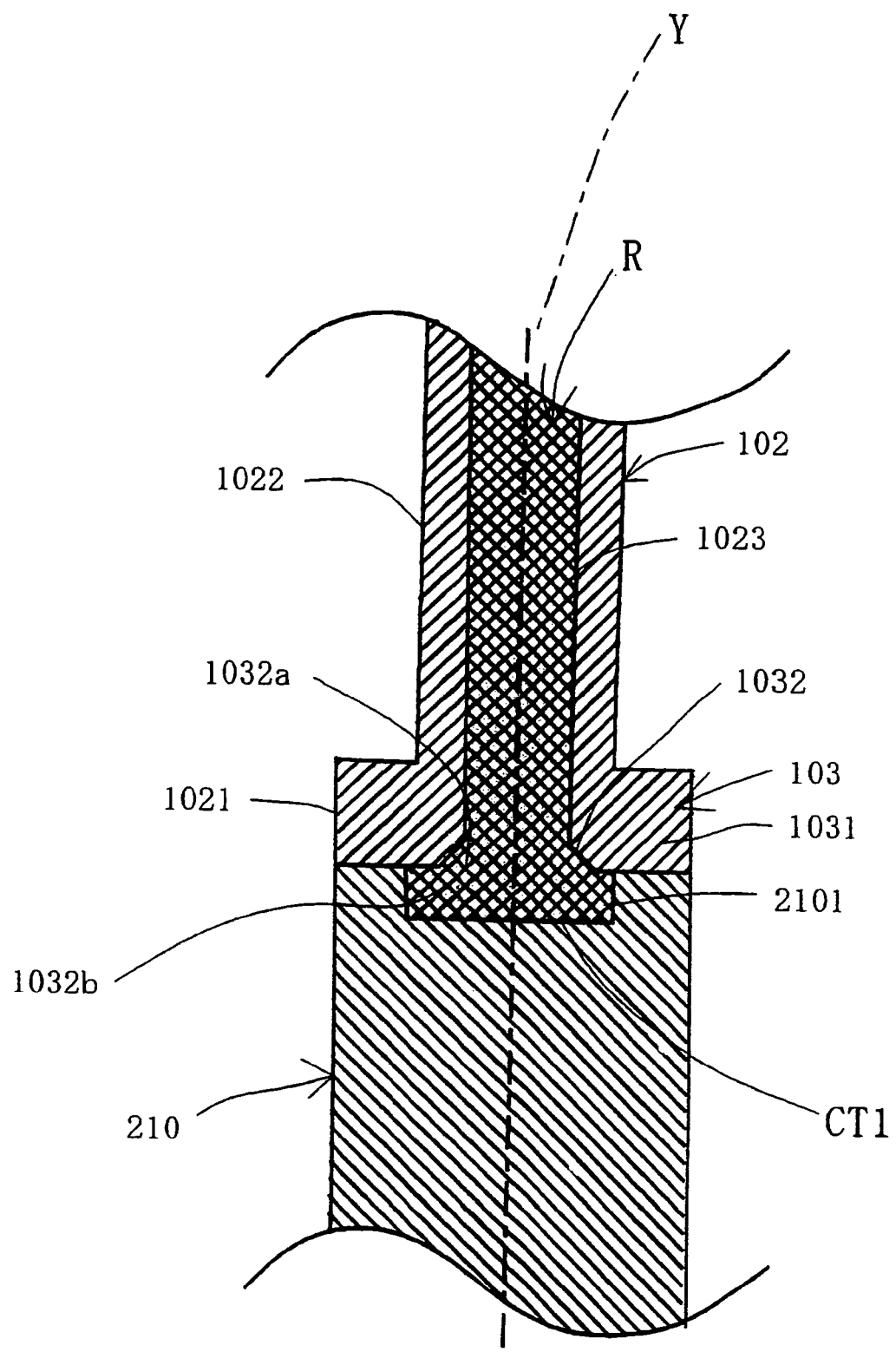
Figures 3, 4:
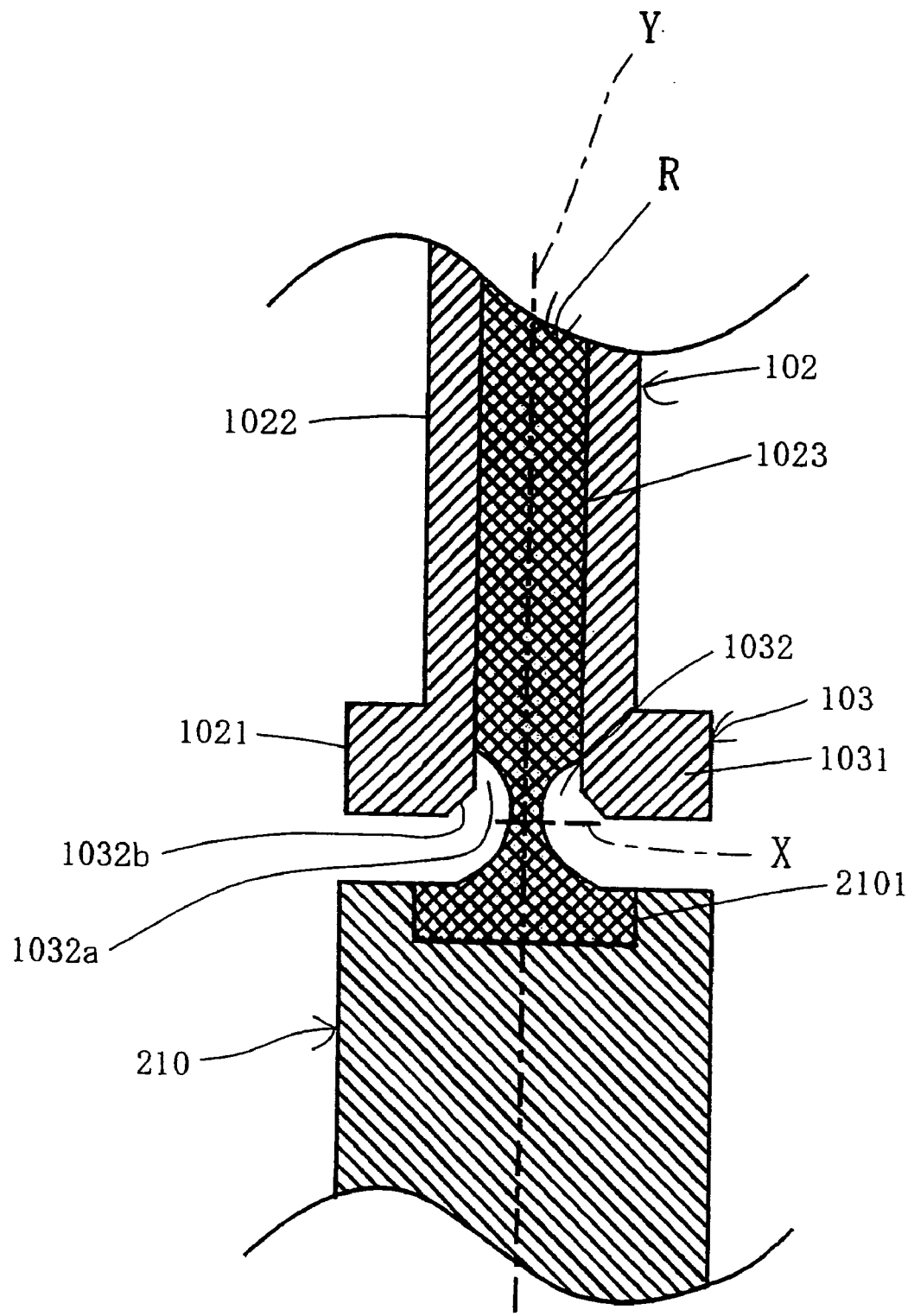
Figures 3, 4, 5:
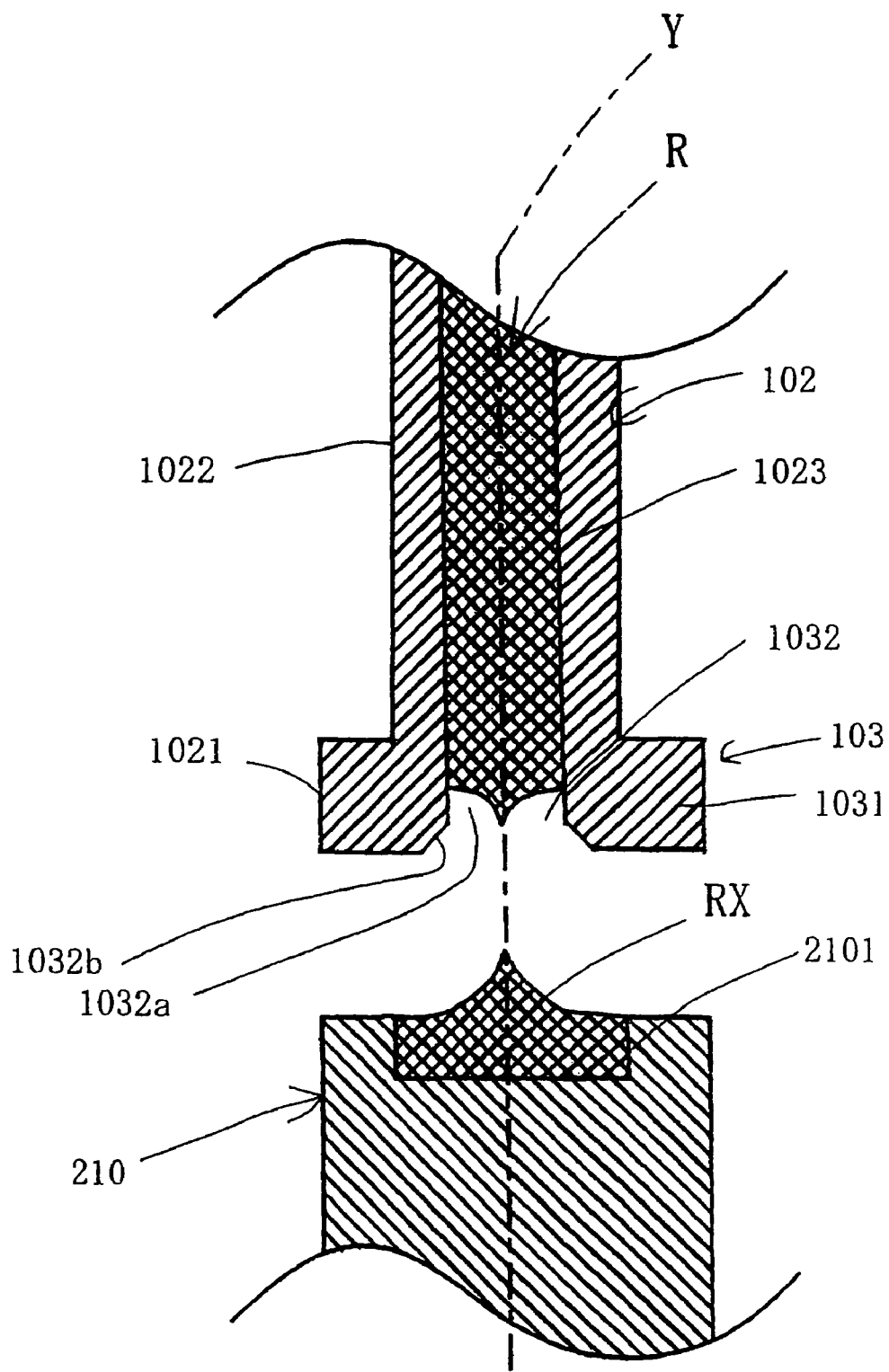
Figures 1, 4:
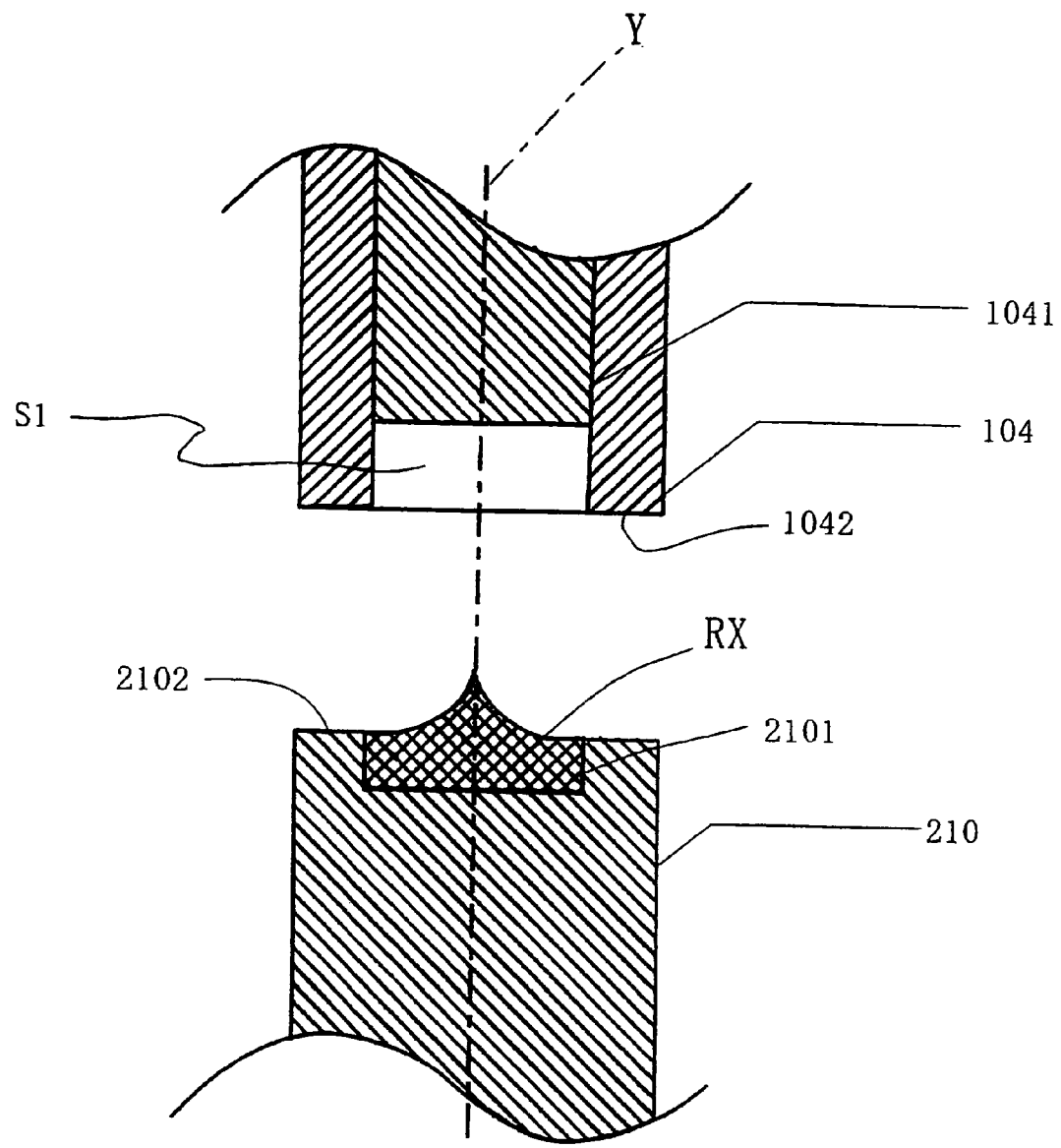
Figures 2, 4:
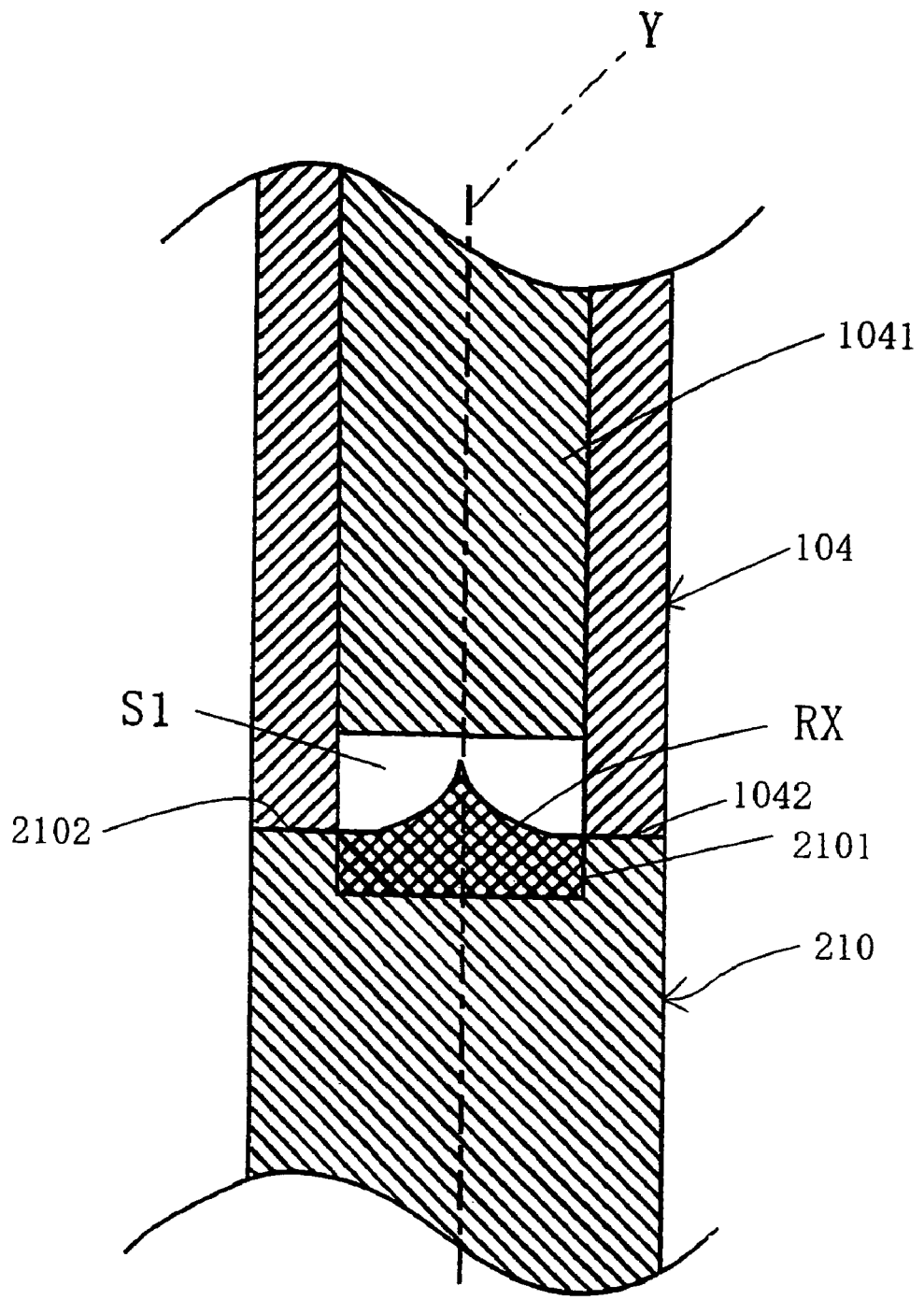
Figures 3, 4:
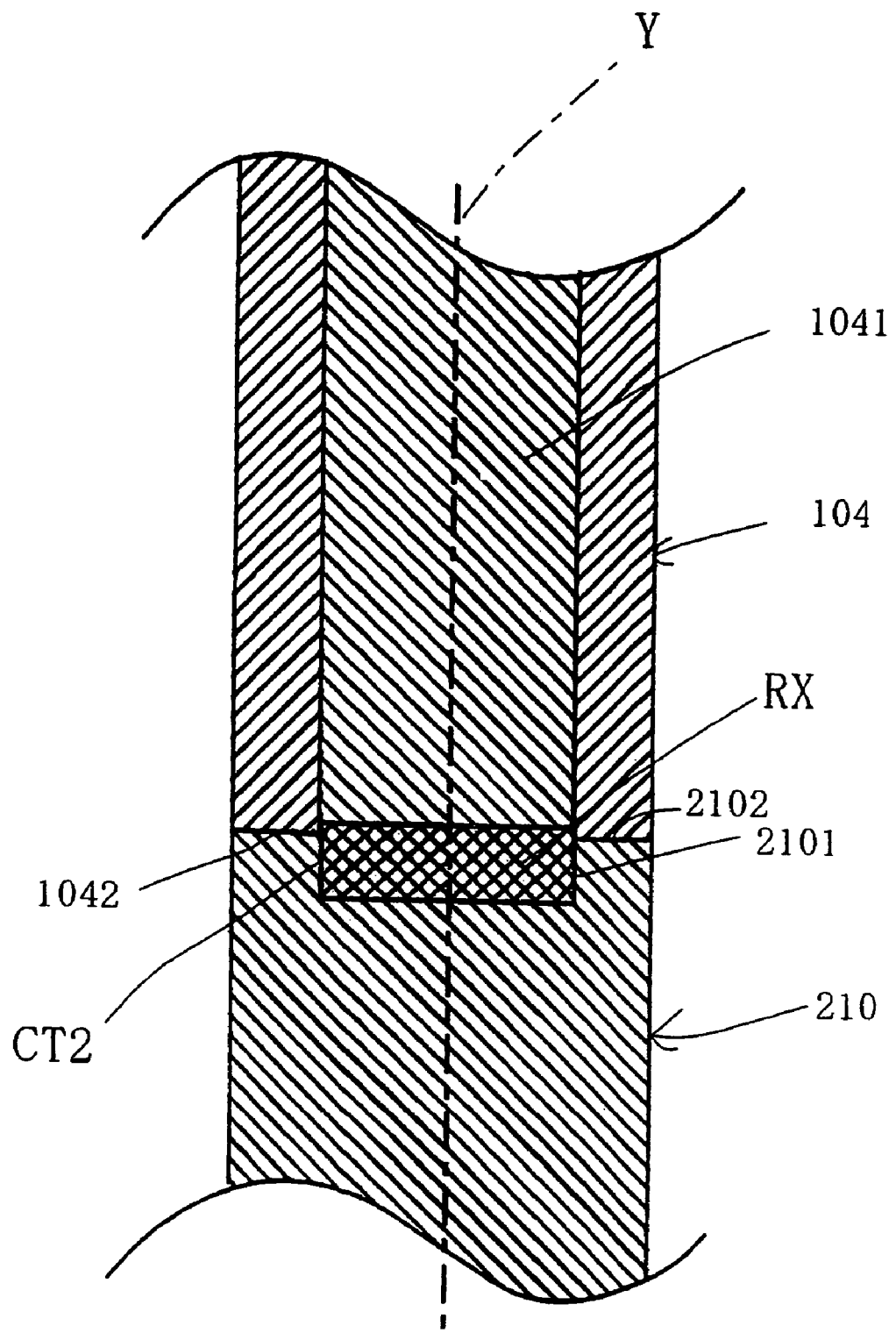
Figures 1, 5:
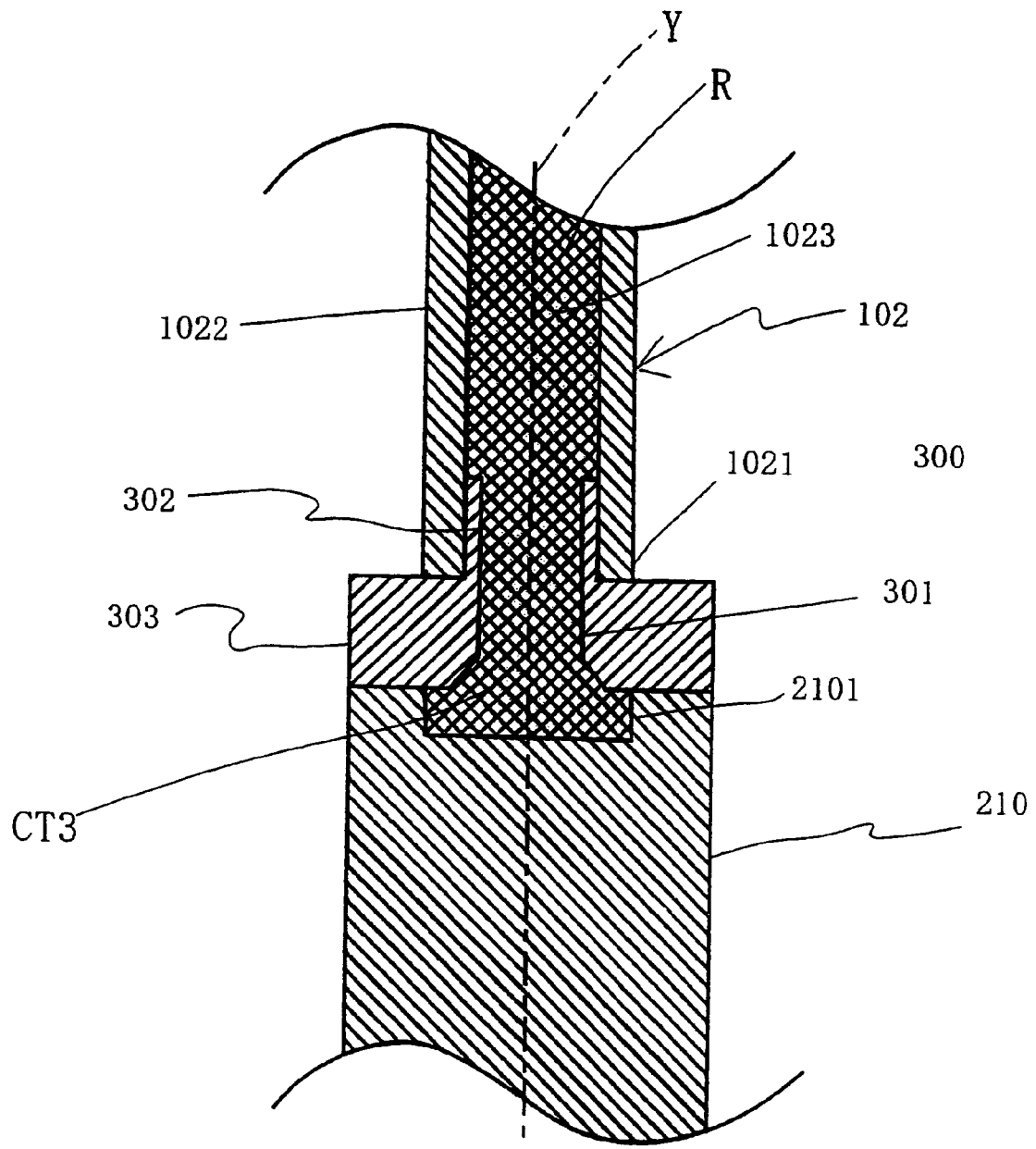
Figures 2, 5:
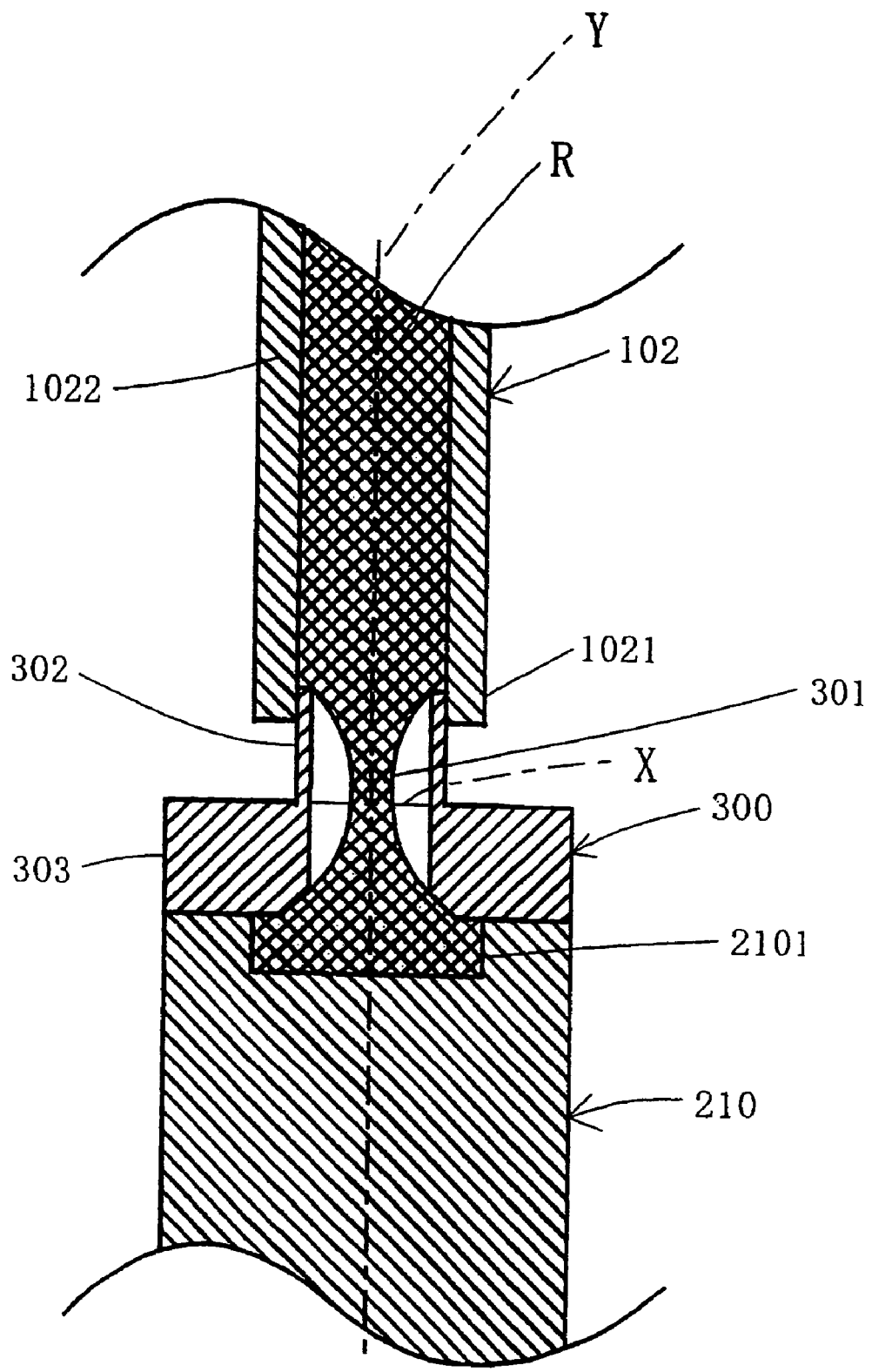
Figures 3, 5:
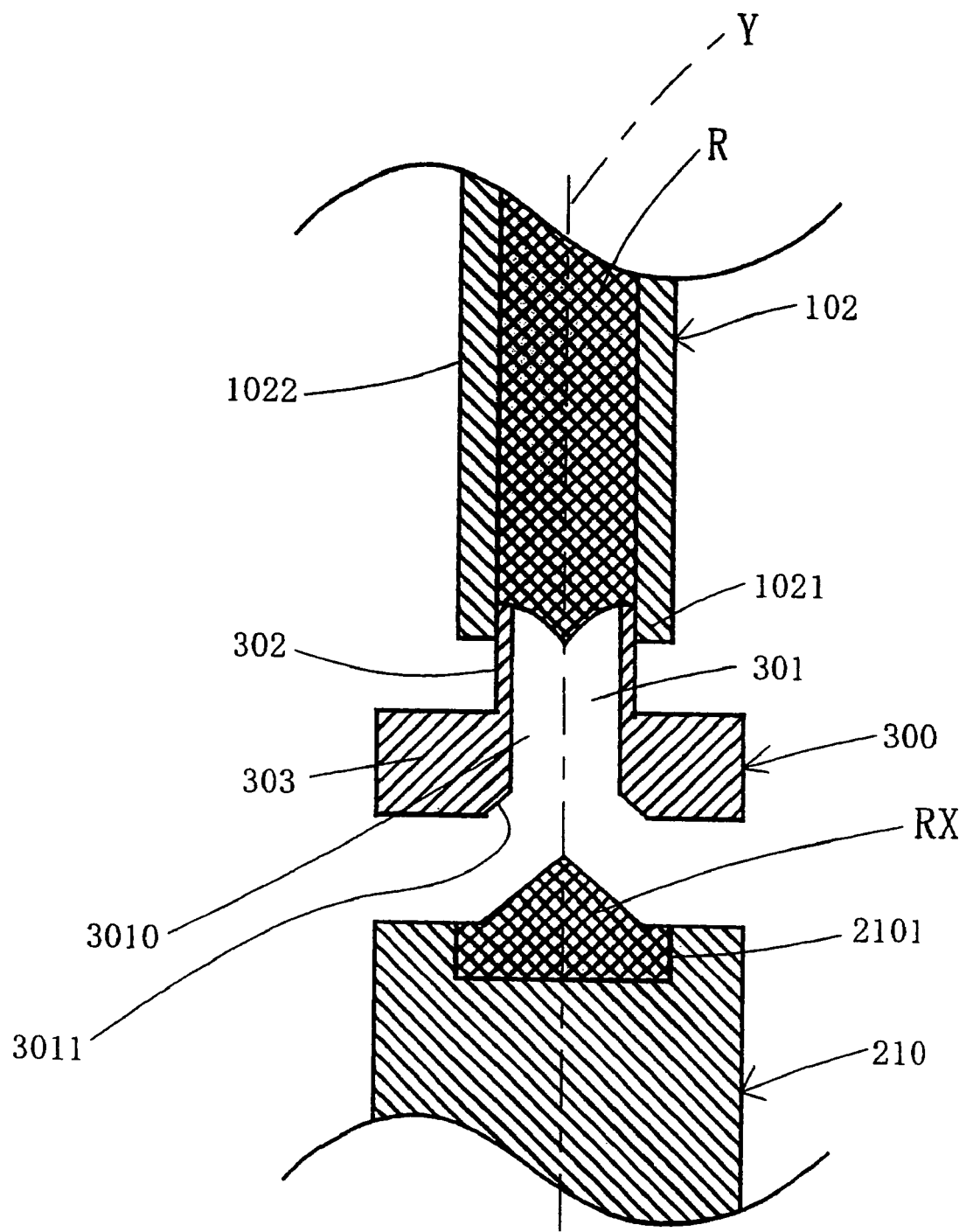

In the present embodiment, particular characteristics lie in the metering process in said metering station 202. FIGS. 3-1 to 3-5 are schematic cross-sectional views of a nozzle for transmission 102 and the bottom force 210 of resin raw materials showing the metering process in the present embodiment in order. FIG. 3-1 shows beginning, FIG. 3-2 shows mold closing, FIG. 3-3 shows filling of resins, FIG. 3-4 shows beginning of tearing off, and FIG. 3-5 shows completion of metering.

In the present embodiment, in FIGS. 3-1 to 3-5, at the tip end portion 1021 of the nozzle for transmission 102, the top force for feeding 103 is provided. That is, as shown in drawings, the top force for feeding 103 makes up the tip end portion of the nozzle for transmission of melted synthetic resin raw materials. In addition, the top force for feeding 103 is provided with the top force main body portion 1031 which closes the bottom force 210. Inside of the top force main body portion 1031, the feeding path 1032 to the bottom force continuously connected from the transmitting path 1023 in the main portion 1022 of said nozzle for transmission 102 is formed. Further, the feeding path 1032 has the first feeding path 1032a which leads to a transmitting path 1023 of said main portion of the nozzle for transmission 1021 and the second feeding path 1032b which continues to the first feeding path and whose cross-sectional area gradually increases towards an opening portion 2101 of the bottom force. R are melted resin raw materials. Y is a virtual axis connecting a central axis of the nozzle for transmission 102, of the top force for feeding 103, and of the bottom force 210. In addition, in the present embodiment, although the feeding path 1032 has the second feeding path 1032 b whose cross-sectional area increases, it is naturally possible that the feeding path 1032 is made up of solely the first feeding path 1032a whose cross-sectional area does not increase.

Therefore, in metering melted resin raw materials R, to a contact surface 1033 of the top force for feeding 103 which contains resin raw materials R in a melted state transmitted to the feeding path 1032 of the tip end portion 1021 from the transmitting path 1023 of main portion of the nozzle for transmission 1022 as shown in FIG. 3-1 (beginning), moldings are closed pressing a contact surface 2102 of the bottom force 210 as shown in FIG. 3-2. In addition, as shown in FIG. 3-2, CT1 is a cavity in a mold made up by closing the mold by an top force for feeding 103 and a bottom force 210.

Next, as shown in FIG. 3-3 (filling of a resin), resin raw materials R in a melted state transmitted from an extruder through the nozzle for transmission 102 are fed in a melted state to the opening portion 2101 in the bottom force 210 through a feeding path 1032 of said top force for feeding 103. By this, as shown in FIG. 3-3 (filling of a resin), said melted resin raw materials R are filled in the cavity in the mold CT1 formed by the feeding path 1032 and the cavity in a mold 2101 of the bottom force.

After that, as shown in FIG. 3-4 (beginning of tearing off), the bottom force 210 is pushed down, said synthetic resin raw materials R contained in said feeding path 1032 are extended, and as shown in FIG. 3-4, the raw materials are torn off at the portion X where the raw materials have prescribed amount of resin blocks RX for molding, thereby obtaining molding resin blocks RX as shown in FIG. 3-5 (completion of metering).

By the way, in the present embodiment, regarding the timing of pulling the end portion to which said melted synthetic resin raw materials R are fed, the pulling is made during the process where an outer surface or a surface is solidified, while an internal portion of the tip end portion maintains a melted state. To be specific, the pulling is made during the process of solidification by regulating a temperature of an inner wall surface of the opening portion 2101 of the bottom force 210 to be set below the melting point of resin raw materials which are filled in the opening portion 2101 so that the internal portion of resin raw materials filled in the opening portion 2101 maintains a melted state while the outer surface or the surface maintains solidification.

Therefore, while the outer surface or the surface of the raw materials filled in the opening portion 2101 of the bottom force 210 are in the solidification process, the resin raw materials contained in the feeding path 1032 of the top force for feeding 1031 are in the melted state or closer to the melted state compared with the raw materials contained in the opening portion 2101 of the bottom force 210. Therefore, since the resin raw materials contained in the opening portion 2101 and the resin raw materials contained in the feeding path 1032 are in mutually different plural-phase states, the lowering of the bottom force 210 to the top force for feeding 1031 is realized as a state of extending the resin raw materials which are contained in the feeding path 1032, and further, by lowering the bottom force 210, the extended portion is torn off.

From these, the temperature of the feeding path 1032 of the top force for feeding 1031 is preferably set over the melting point of said synthetic resin raw materials, and the temperature of the bottom force 210, in particular, the temperature of the inner wall surface of its opening portion 2101 is set to be less than the melting point of said synthetic resin raw materials. Although the embodiment of the present invention is not specifically limited, it is preferable that the temperature of said feeding path is set higher than the melting point of synthetic resin raw materials by 10 to 20° C. and that the temperature of the bottom force is set to be within the range of 10 to 80° C.

In addition, although said embodiment makes the bottom force 210 move vertically to the top force for feeding 1031 thereby detaching and shifting said bottom force 210 from said feeding path 1032 for tearing off, the top force for feeding 1031 may move vertically to the bottom force 210.

Further, in the present embodiment, regarding the feeding path 1032 to said bottom force, by providing not only the first feeding path 1032a which leads to the transmitting path 1023 of said main portion of the nozzle for transmission 1022 but also the second feeding path 1032b which continues to the first feeding path and whose cross-sectional area gradually increases towards an opening portion 2101 of the bottom force, as shown in FIGS. 3-3 and 3-4, pulling and tearing off of the resin raw materials are easily made and the shapes of resin raw materials RX which were placed and remained on the opening portion 2101 of the bottom force 210 are easily modified and therefore, such embodiment is preferable. However, it is possible to provide the feeding path 1032 in which the first feeding path 1032a continues without providing the second feeding path 1032b.

(Compressing Process (Molding Process))

Next, as shown in FIG. 4-1, the resin raw materials RX which are metered, placed and remained on the opening portion 2101 of the bottom force 210, with the rotational movement of the bottom force 210 together with the molding table 201, shift to the compressing station 203. In addition, in this compressing station 203, the top force for molding 104 of the present embodiment is made up of a tubular body, and in the axis direction in this top force for molding 104, a molding pin is internally installed and is vertically slidable. In addition, at the initial stage of the compressing process, as shown in FIGS. 4-1 and 4-2, this top force for molding 104 is holding the space S1 which takes in the resin raw materials RX which have jumped out of the upper side being left from the opening portion 2101 of the bottom force 210.

Therefore, as shown in FIG. 4-2, the bottom force 210 in which these torn resin blocks RX for molding are placed and remained is pushed up to the top force for molding 104, and the mold is closed by bringing a contact face 2102 of the bottom force 210 into contact with a contact face 1042 of the molding top force 104. Further, after taking the resin raw materials RW which were jumped out of the opening portion 2101 in the space S1, as shown in FIG. 4-3, by making the molding pin 1041 in the top force for molding 104 slide downward, the above mentioned resin raw materials RW are compressed and molded (formed) by the cavity in the mold CT2 formed by this top force for molding 104 and the bottom force 210.

(Other Metering Process/Metering Process 2)

FIG. 5-1 is a schematic cross-sectional view showing the other metering process in the molding method of the present invention, and said FIG. 5-1 shows the state in which the top force for feeding 300 and the bottom force 210 close the mold and the melted resin raw materials R are filled in the cavity CT3 formed by the feeding path 301 of the top force for molding 300 and the opening portion 2101 of the bottom force.

In this embodiment, unlike the above mentioned embodiment, as shown in FIG. 5-1, the top force for feeding 300 is made up as the top force which is separate and independent from the nozzle for transmission 102. In other words, as shown in FIG. 5-1, the top force for feeding 300 is made up of a sliding portion 302 attached in the nozzle for transmission 102 vertically slidable in the axis direction to the nozzle for transmission 102 and the flange-like main body portion of the top force 303 continuing to this slide portion 302 and contacting with the nozzle for transmission 102 at the time of closing the mold, and inside of the top force for feeding 300 which leads from the sliding portion 302 to the main body portion of the top force 303, at the time of closing the mold, the feeding path 301 is provided in which one leads to the transmitting path 1023 of the main portion 1022 of said nozzle for transmission 102, and the other leads to the opening portion 2101 of the bottom force 210.

Therefore, according to said top force for feeding 300, as shown in FIG. 5-1, pressing the bottom force 210 to this top force for feeding 300, the mold is closed pushing up the top force for feeding 300 making the top force for feeding 300 slide to said nozzle for transmission 102, followed by feeding the melted synthetic resin raw materials from said feeding path 301 of the top force for feeding 300 to the opening portion 2101 inside of the bottom force, said synthetic resins are filled in the cavity in the mold CT3 made up by closing the mold with the top force for feeding 200 and the bottom force 210.

Next, as shown in FIG. 5-2, by pushing down the bottom force 210, followed by sliding and lowering the top force for feeding 300 from the nozzle for transmission 102, the synthetic resin raw materials contained in this feeding path 301 are extended and are torn off at the portion X where the resin blocks RX have the prescribed amount, and as shown in FIG. 5-3, the prescribed amount of resin blocks RX are placed and remained in the bottom force 210.

According to this method, since the top force for feeding 300 is made up as a top force which is separate and independent from the nozzle for transmission 102 and since the synthetic resin raw materials are extended and torn off by making the top force main body portion 303 having the sliding portion 302 vertically slide, said extending and tearing can be achieved very easily. In addition, in the present embodiment, although the feeding path is made up of the first feeding path 3010 and the second feeding path 3011 which is continuous from the first feeding path 3010 and whose cross-sectional area gradually increases toward the opening portion 2101 of the bottom force as in said embodiment, the present invention is not limited to this as it is not limited to already mentioned embodiment.

In the case of the present embodiment, regarding the timing of pulling the end portion to which said melted synthetic resin raw materials R are fed, the pulling is made during the process where the outer surface or the surface is solidified, while an internal portion of the end portion maintains melted state.

To be specific, the pulling is made during the process of solidification by regulating a temperature of an inner wall surface of the opening portion 2101 of the bottom force 210 to be set below the melting point of resin raw materials which are filled in the opening portion 2101 so that the internal portion of resin raw materials filled in the opening portion 2101 maintains a melted state while the outer surface or the surface maintains solidification.

Therefore, while the resin raw materials filled in the opening portion 2101 of the bottom force 210 are in the process of solidification, the resin raw materials contained in the feeding path 301 of the top force for feeding 300 is in a melted or nearly melted state. Thus, since resin raw materials contained in the opening portion 2101 and the resin raw materials contained in the feeding path 301 are in mutually different plural-phase state, lowering of the bottom force 210 to the top force for feeding 300 is realized as a state of extending the resin raw materials which are contained in the feeding path 1032, and further, by lowering the bottom force 210, the extended portion is torn off.

From this, it is preferable that the temperature of the feeding path 301 of the top force for feeding 300 is set over the melting point of said synthetic resin raw materials as in the already mentioned embodiment and that the temperature of the bottom force 210, in particular, the temperature of the inner wall surface of the opening portion 2101 is set to be lower than the melting point of said synthetic resin raw materials. Although not specifically limited in the present invention, for example, it is preferable that the temperature of said feeding path 301 is set to be over the melting point of said synthetic resin raw materials by 10 to 20° C., and that the temperature of the bottom force is set to be within the range of 10 to 80° C.

In addition, as in said embodiment, the resin blocks RX metered by this method are molded into prescribed shapes by making the bottom force 210 in which the resin blocks RX are placed and remained in the opening portion 2101 rotate and shift to the compressing station, pushing up this bottom force 210 in the molding top force thereby closing the mold followed by compressing as mentioned before.

(Other Metering Process/Metering Process 3)

Figures 1, 6:
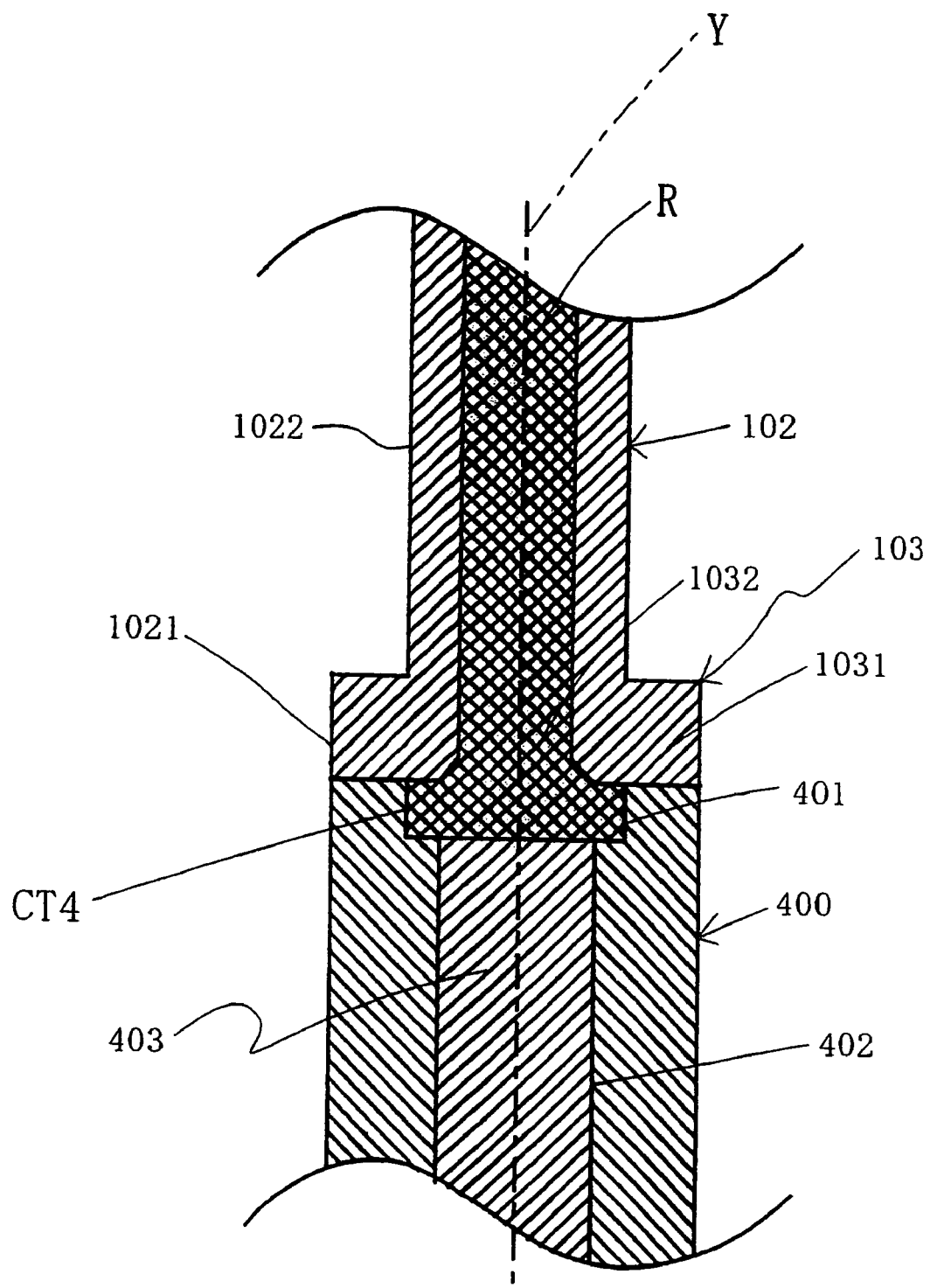
Figures 2, 6:
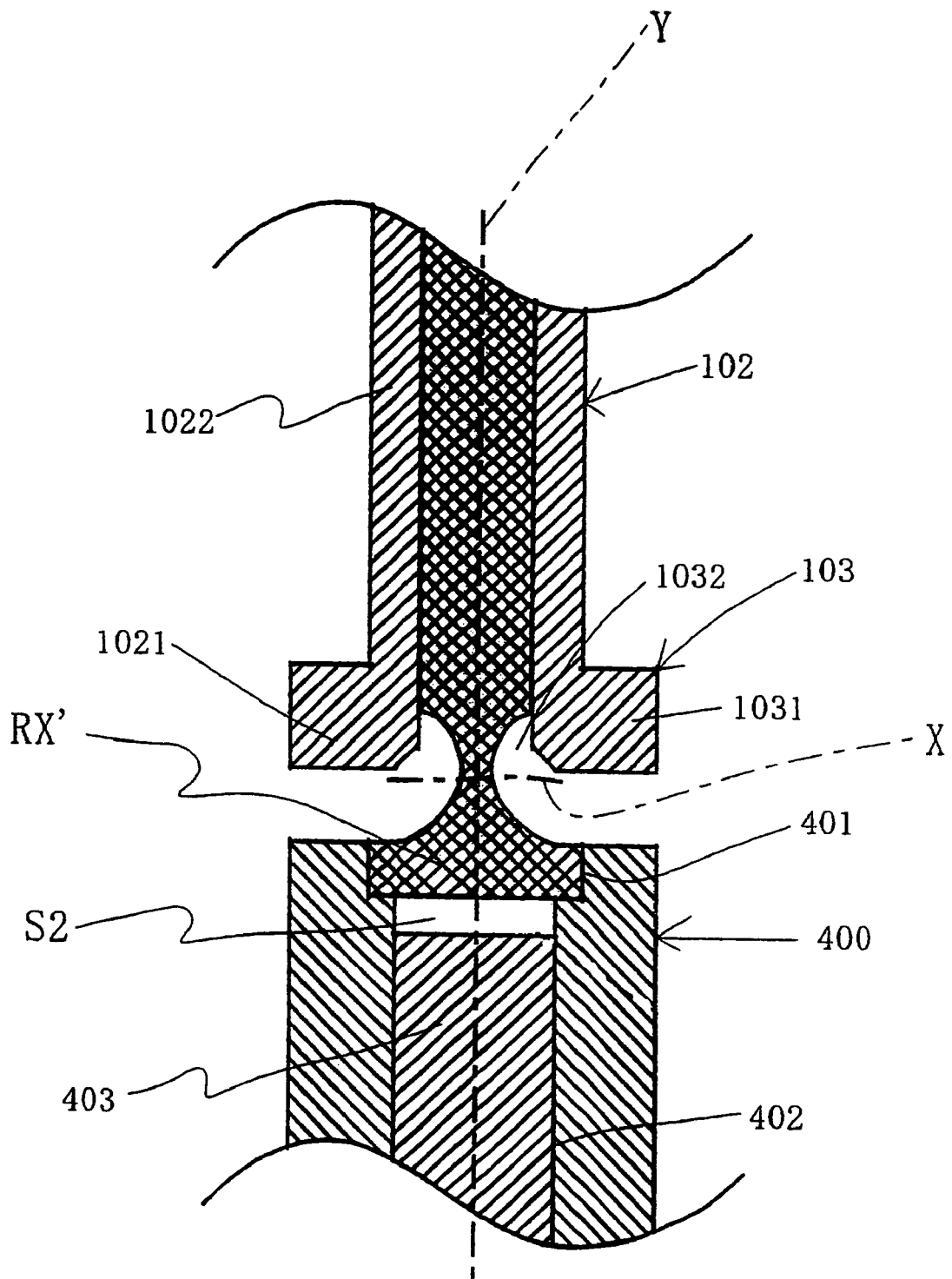
Figures 3, 6:
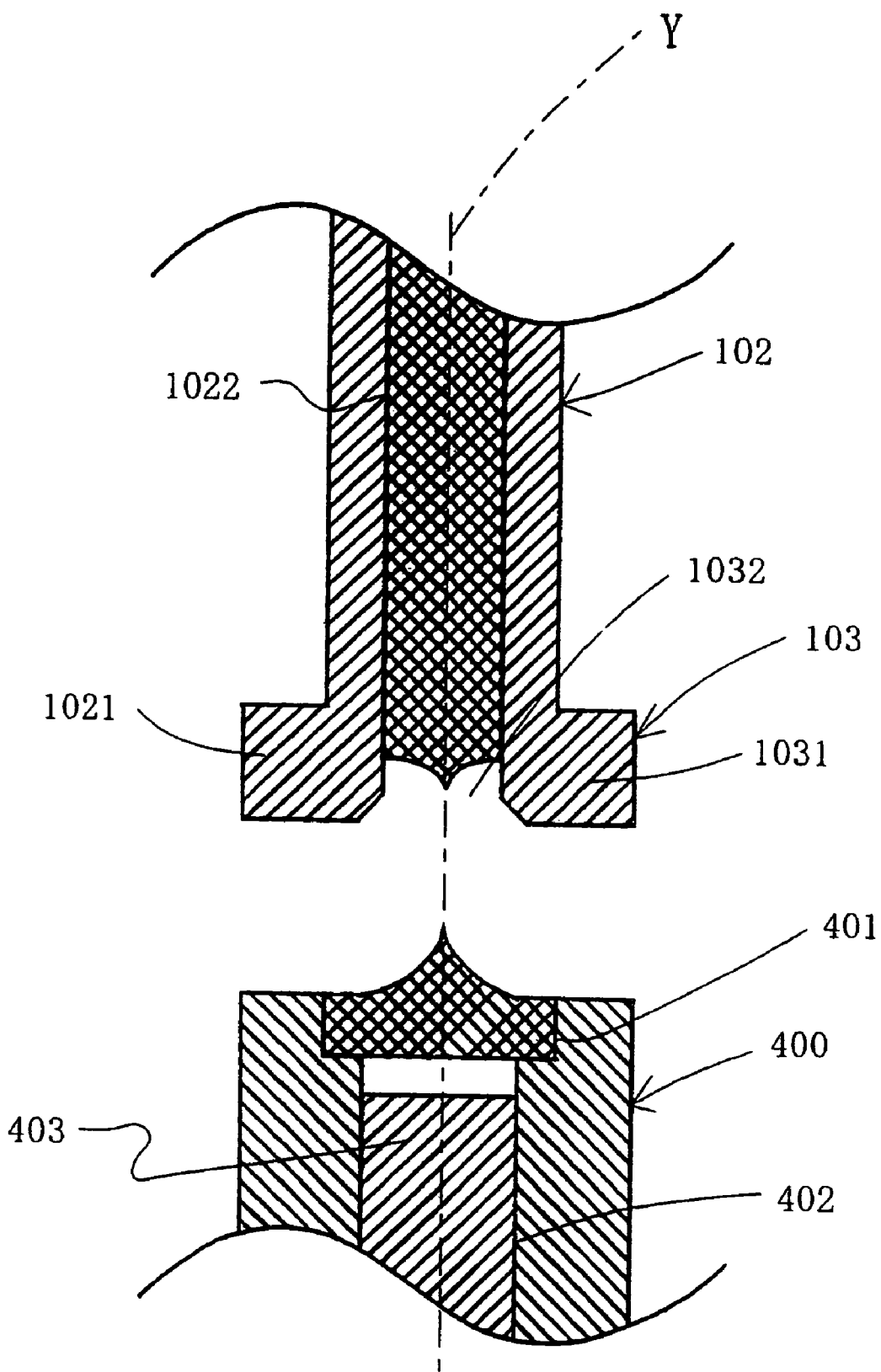

FIG. 6-1 is the schematic cross-sectional view showing the other metering process in the molding method of the present invention and the FIG. 6-1 shows the state in which the melted resin raw materials R are filled in the cavity CT4 in which the top force for feeding 102 and the bottom force 400 used in said metering process 1 close the mold and which is formed by the feeding path 1032 of the top force for molding 102 and the opening portion 401 of the bottom force 400. In addition, regarding the top force for feeding 102 which makes up the nozzle for transmission 102 and its tip end portion 1021, the reference numerals show the same portions as those shown in said FIGS. 3-1 to 3-5.

In this method, the bottom force 400 is provided with a sliding core 402 which communicates to the opening portion of said bottom force 400 and a pin 403 which moves vertically and slidably in this sliding core 402.

Therefore, as shown in FIG. 6-2, by lowering said pin 402 synchronizing with the lowering of said bottom force 400 and by maintaining said raw materials resin RX' by negative pressure caused by the space S2 generated between the raw materials resin RX' and the pin 402 of the bottom force 400, said synthetic resin raw materials R contained in said feeding path 1032 are extended, and are torn off at the portion X where the resin blocks RX for molding have a prescribed amount.

(Other Metering Process/Metering Process 4)

Figures 1, 7:
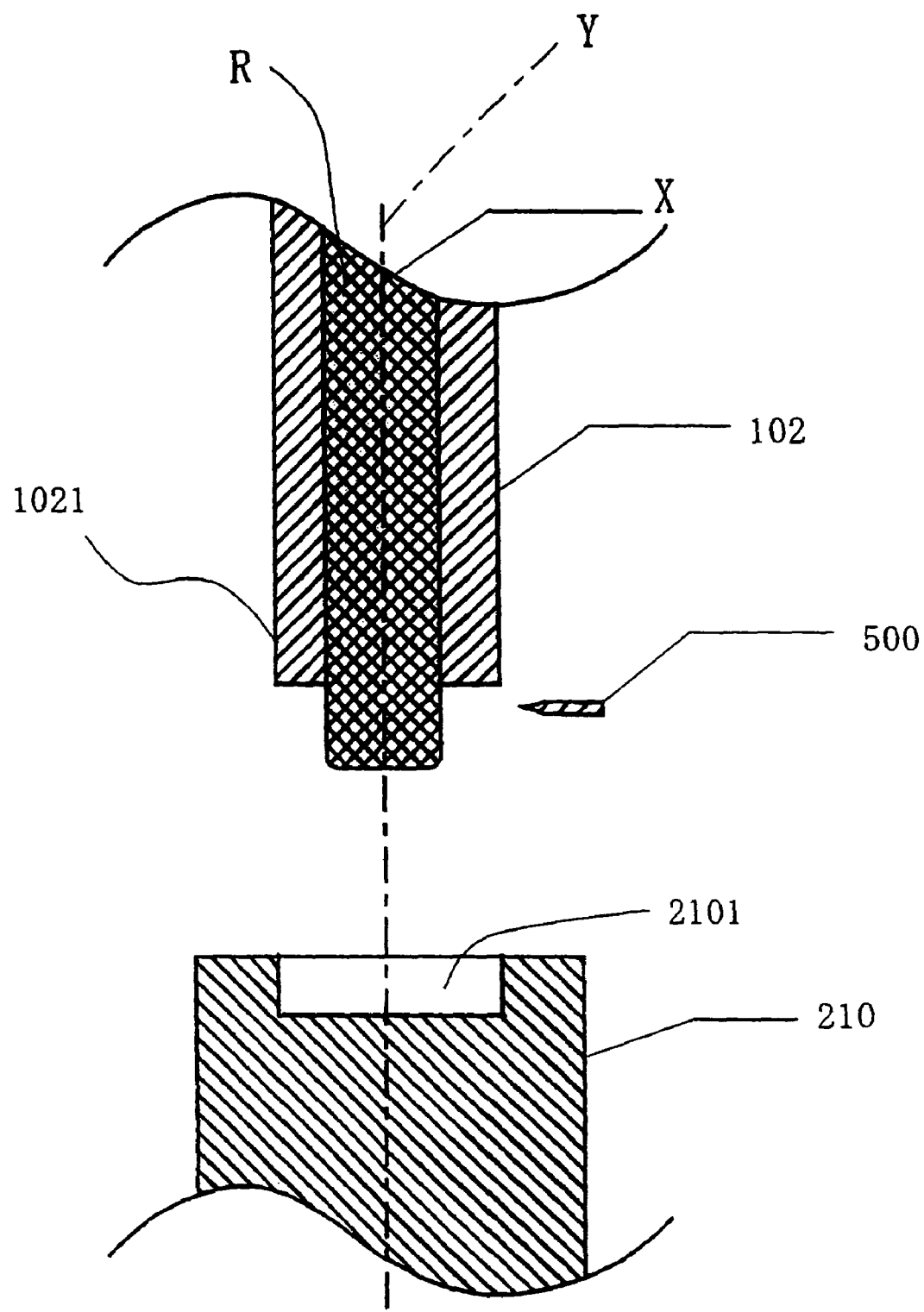
Figures 2, 7:
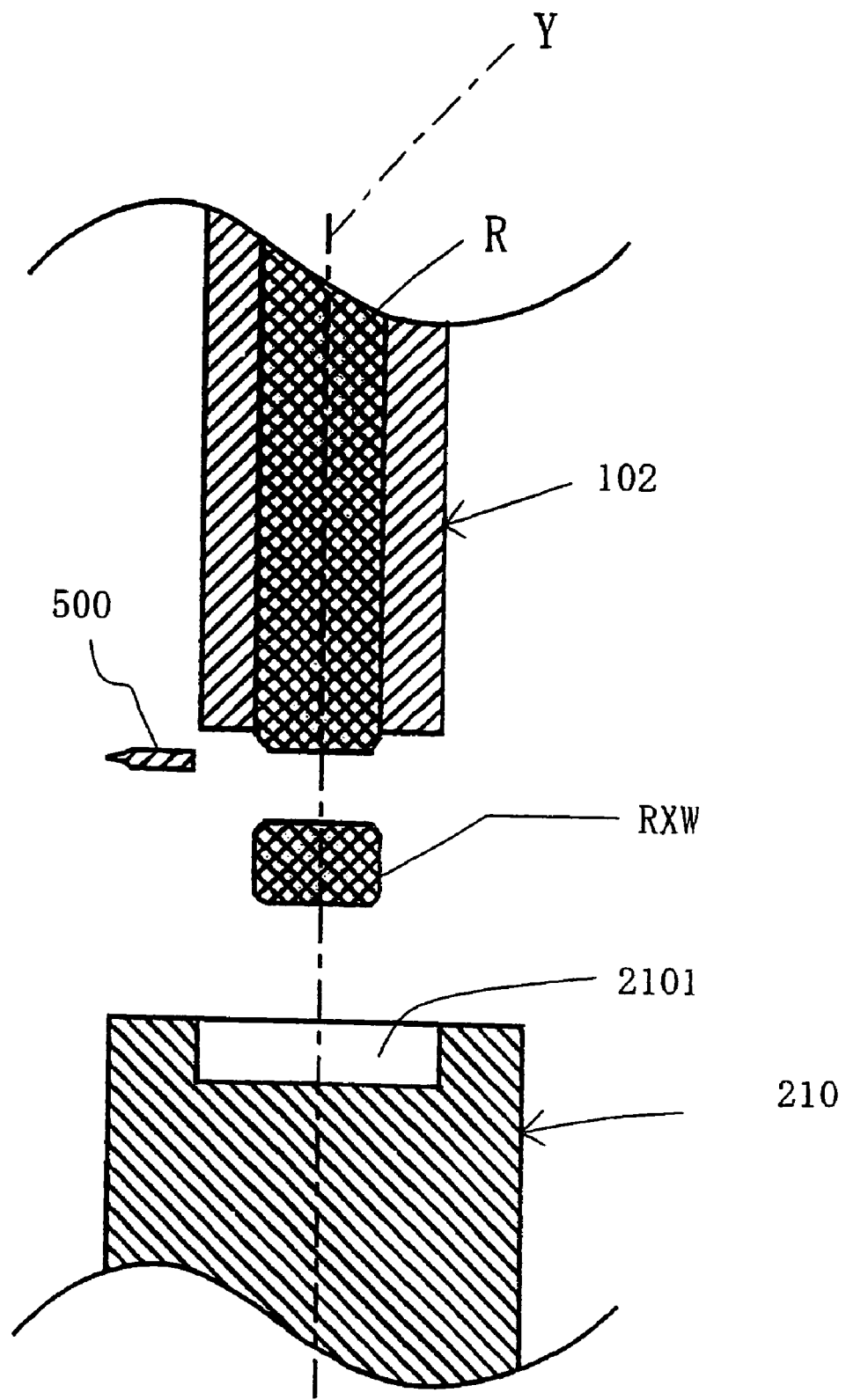
Figures 3, 7:
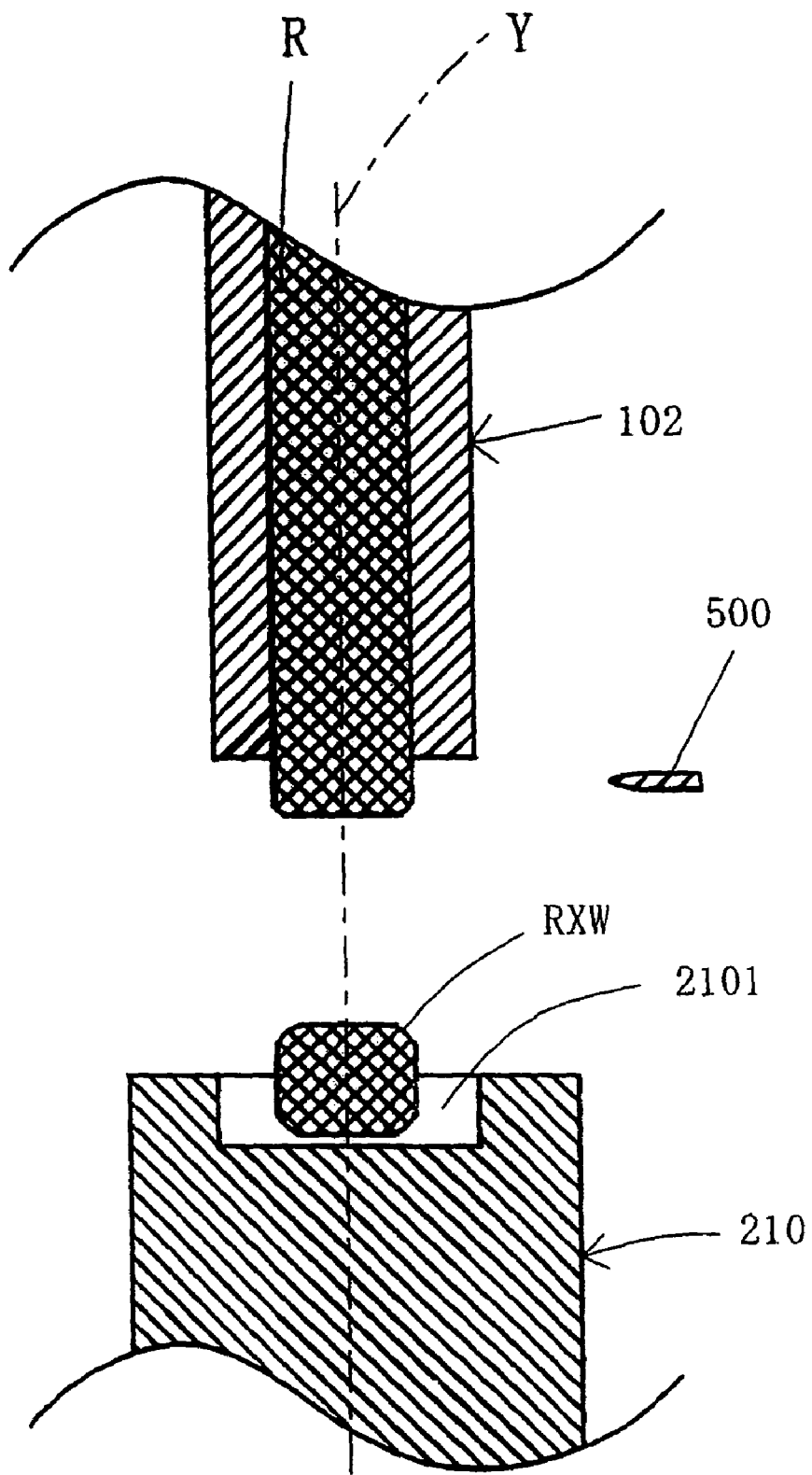

FIGS. 7-1 to 7-3 are schematic cross-sectional views showing the order of each of other metering processes in the molding method of the present invention.

According to the present method, as shown in FIG. 7-1, the resin raw materials R in a melted state fed from the tip end portion 1021 of the nozzle for transmission 102 extruded by the extruder 100 are cut with a cutter 500 as shown in FIG. 7-2, and are put in the opening portion 2101 of the bottom force 210, followed by compressing the resin blocks RXW which were put in the opening portion 2101 as shown in FIG. 7-3, expanding on a cavity formed by the opening portion 2101 of the bottom force and top force (not illustrated) for molding thereby molding the resin raw material R.

In this method, the metering of the resin raw materials R in the melted state is made by the amount regulated by an extruding speed of resins by the extruder 100 and a driving tact of a cutter 500.

In the molding method of the present invention, it is also possible to incorporate as one process of the production process of the medical caps. In other words, when the medical cap is composed of a medical plug body and an outer frame which holds the medical plug body, after molding the medical plug body by the method of the present invention, the outer frame of the cap made of a synthetic resin is molded by the injection molding method or the compression molding method, thereby integrating said plug body and the outer frame. On the other hand, it is possible to integrally mold by molding the plug body by the method of the present invention after molding the outer frame. Further, it is possible to prepare medical caps by molding the medical plug body by the method of the present invention and by separately molding the outer frame, followed by fitting said plug body into said outer frame.

(Raw Material Compositions)

Resin raw materials used in the present invention are not specifically limited. There is no problem as long as they are synthetic resins applicable to the present molding method. For example, in addition to polyolefinic resins such as polyethylene, polypropylene, polybutene, polyisoprene, polypentene, ethylenevinylacetate copolymers, ethylene/ethyl acrylate copolymers, and the like, various kinds of polymers can be used such as polyvinyl chloride, polystyrene, polylactic acid, acrylic resin, methacrylic resin, polyamide, polyacetal, polycarbonate, thermoplastic polyester resins, fluorine resins, polyamide, thermoplastic polyether resins, thermoplastic elastomers, and the like.

In particular, since thermoplastic elastomers or compositions thereof have constant viscoelasticity, they are suitable for cutting or extending resins in a metering step, and also they are most suitable for employing the molding method of the present invention. For example, they are generally called thermoplastic elastomer resin compositions, which mean that paraffin oils and olefinic copolymers are included in block copolymers. Basic performance of thermoplastic elastomer resin compositions is determined depending on the kinds of the block copolymers. As specific examples of thermoplastic elastomer resin compositions used in the present invention, block copolymers of styrene series, olefin series, vinyl chloride series, urethane series, polyester series, polyamide series, and the like can be exemplified. Among them, SEBS (styrene ethylene butylenes styrene block copolymer) and SBPS (styrene butylenes propylene styrene block copolymer) which are hydrogenated styrene based block copolymers composed of vinyl aromatic compounds and conjugated diene-compounds are preferable since they are excellent in rubber characteristics and are suitable for the present molding method as well.

Further, the thickness of medical plug bodies obtained by the production method of the present invention are thick moldings whose thickness is generally 1 mm and preferably 2 to 10 mm.

According to the molding method of synthetic resin moldings in the present invention, since the metering is made by cutting the melted synthetic resin raw materials on the way of feeding thereby molding resin blocks placed and remained in a bottom force by the metering of cutting, the melted resin raw materials can be put with constant amount and constant shapes, and therefore, even when thick moldings are used, synthetic resin moldings having uniform quality as a whole can be continuously obtained.

In particular, since the molding method in which the melted synthetic resin raw materials are extended on the way of feeding, followed by tearing off the extended portion and molding the resin blocks which were torn off, metering of the resin raw materials can be made during the process of tearing off the extended portion and further, resin blocks which were torn off as resin raw materials which nearly equals to the shape molded by the top force can be obtained later, the change in contents and shapes of resin raw materials in said mold can be inhibited as much as possible and thick moldings with uniform quality and prescribed shapes can easily and continuously be molded in the minimum amount of resins assuming the final moldings.

The molding method of the present invention can be utilized in the molding method of various kinds of synthetic resin moldings. In particular, in the medical field, the molding method of the present invention is suitable for the molding method of thermoplastic elastomer resin moldings preferably used as a plug body to which a needle can be stuck for infusion containers or infusion caps.

What is claimed is:

1. A method for compression molding synthetic resin moldings comprising:
   a metering process for metering a synthetic resin raw material made of thermoplastic elastomers having a viscoelasticity in a melted state or compositions thereof fed from a feeding path in a top force for feeding, wherein said metering process comprises:
      filling a prescribed amount of said melted synthetic resin raw material into a cavity in a closed mold formed by the feeding path in the top force for feeding and an opening portion of a bottom force;
      extending said melted synthetic resin raw material contained in said feeding path in an axial direction by lowering said bottom force relative to said top force for feeding, wherein the lowering of said bottom force is made during a process where an outer surface of said synthetic resin raw material contained in said opening portion of said bottom force is solidified and while both an internal portion of said synthetic resin raw material contained in said opening portion of said bottom force and said synthetic resin raw material contained in said feeding path of said top force for feeding are maintained in a melted state, and
      tearing off the portion extended in the axial direction by further lowering said bottom force to provide a prescribed amount of the resin block for molding such that the resin raw material which substantially equals to the shape molded; and
   a compression process for compressing said resin block for molding of said synthetic resin raw material that is metered in said metering process by the top force for molding and molding said resin block, wherein said compression process is a separate process from said metering process and uses a top force for molding, said compression process comprising:
      shifting the torn and metered resin block for molding which has been placed in and remains in said bottom force, together with said bottom force, to a compressing station, and
      compressing said resin block continuously by the top force for molding and molding said resin block.

2. The method for compression molding synthetic resin moldings as set forth in claim 1, wherein a temperature of an inner wall surface of the opening portion of the bottom force is set below the melting point of the resin raw material which is filled in the opening portion.

3. The method for compression molding the synthetic resin moldings as set forth in claim 1, wherein said tearing off is made by detaching and shifting said bottom force from said feeding path.

4. The method for compression molding the synthetic resin moldings as set forth in claim 2, wherein the temperature of said feeding path is set to be higher than the melting point of said synthetic resin raw material by 10 to 20° C. and the temperature of the bottom force is set to be 10 to 80° C.

5. The method for compression molding the synthetic resin moldings as set forth in claim 1, wherein said top force for feeding is made up at a tip end portion of a nozzle for transmission of said synthetic resin raw material and provided with a top force main body portion which closes the bottom force, and the feeding path to the bottom force which continues from a transmitting path of the main portion of said nozzle for transmission is provided inside of said top force main body portion.

6. The method for compression molding the synthetic resin moldings as set forth in claim 1, wherein said top force for feeding is movably divided to the tip end portion of the nozzle for transmission of said synthetic resin raw material, said top force is made up of a sliding portion vertically and slidably installed to said tip end portion and the top force main body portion which closes the bottom force which continues to this sliding portion, and the feeding path to the bottom force which leads to the transmitting path of the main portion of said nozzle for transmission inside of said sliding portion and said main body portion.

7. The method for compression molding the synthetic resin moldings as set forth in claim 1, wherein the feeding path to said bottom force has a first feeding path which leads to the transmitting path of the main portion of said nozzle for transmission and a second feeding path which continues to the first feeding path and whose cross-sectional area gradually increases towards the opening portion of the bottom force.

8. The method for compression molding the synthetic resin moldings as set forth in claim 1, wherein said bottom force is provided with a sliding core which communicates to the opening portion of said bottom force and a pin which slides and moves in this sliding core, and comprising a process of extending said synthetic resin raw material contained in said feeding path, synchronizing with the pushing down of said bottom force, said pin is pulled down and while maintaining a raw material resin by negative pressure generated between said raw material resin to be placed and remained and the bottom force, and a process of tearing off the resin raw material at the portion where the raw material has prescribed amount of the resin block for molding.

9. The method for compression molding the synthetic resin moldings as set forth in claim 1, wherein said synthetic resin moldings is a medical plug body.

10. A method for compression molding synthetic resin moldings comprising:
a metering process for metering a synthetic resin raw material made of thermoplastic elastomers having a viscoelasticity in a melted state or compositions thereof fed from a feeding path in a top force for feeding, wherein said metering process comprises:
filling a prescribed amount of said melted synthetic resin raw material into a cavity in a closed mold formed by the feeding path in the top force for feeding and an opening portion of a bottom force;
extending said melted synthetic resin raw material contained in said feeding path in an axial direction by moving up said top force for feeding relative to said bottom force, wherein the moving up of said top force for feeding is made during a process where an outer surface of said synthetic resin raw material contained in said opening portion of said bottom force is solidified and while both an internal portion of said synthetic resin raw material contained in said opening portion of said bottom force and said synthetic resin raw material contained in said feeding path of said top force for feeding are maintained in a melted state, and
tearing off the portion extended in the axial direction by further moving up said top force for feeding to provide a prescribed amount of the resin block for molding such that the resin raw material which substantially equals to the shape molded; and
a compression process for compressing said resin block for molding of said synthetic resin raw material that is metered in said metering process by the top force for molding and molding said resin block, wherein said compression process is a separate process from said metering process and uses a top force for molding, said compression process comprising:
shifting the torn and metered resin block for molding which has been placed in and remains in said bottom force, together with said bottom force, to a compressing station, and
compressing said resin block continuously by the top force for molding and molding said resin block.

11. The method for compression molding the synthetic resin moldings as set forth in claim 10, wherein tearing off is made by detaching and shifting said top force for feeding from said feeding path.

\* \* \* \* \*